United States Patent [19]

Dunn

[11] Patent Number: 4,921,427
[45] Date of Patent: May 1, 1990

[54] EDUCATIONAL DEVICE

[76] Inventor: Jeffery W. Dunn, 738 E. Osceola Ave., Lake Wales, Fla. 33853

[21] Appl. No.: 396,095

[22] Filed: Aug. 21, 1989

[51] Int. Cl.⁵ .............................................. G09B 5/00
[52] U.S. Cl. .................................... 434/340; 434/327; 434/334; 434/335; 273/296; 273/302
[58] Field of Search ............... 434/340, 322, 327, 334, 434/335, 338, 350, 112, 169, 201, 202; 273/292, 293, 296, 302, 307, 308, 148 A, 309

[56] References Cited

U.S. PATENT DOCUMENTS

| | | | |
|---|---|---|---|
| D. 191,909 | 12/1961 | Kharasch | 434/322 X |
| 1,749,226 | 3/1930 | Pressey | 434/327 |
| 2,627,672 | 2/1953 | Polton | 434/338 |
| 3,143,348 | 8/1964 | Carsen et al. | 434/347 |
| 3,902,257 | 9/1975 | Mesener | 434/327 |
| 3,928,922 | 12/1975 | Rosenbaum | 434/322 |
| 4,164,078 | 8/1979 | Goldfarb | 434/335 |
| 4,303,398 | 12/1981 | Yoseloff | 434/335 |
| 4,451,911 | 5/1984 | Klose et al. | |
| 4,464,124 | 8/1984 | Romero et al. | |
| 4,474,557 | 10/1984 | Clossey | |
| 4,505,682 | 3/1985 | Thompson | |
| 4,673,357 | 6/1987 | Ito | |

Primary Examiner—Richard J. Apley
Assistant Examiner—J. L. Doyle
Attorney, Agent, or Firm—Jerry T. Kearns

[57] ABSTRACT

An educational device includes a generally L-shaped visual blocking stand for obstructing visual contact between a question asking individual and a question answering individual. A representation of a human eye is formed on one side of a vertical portion of the stand and includes two different colored electric lamps connected for selectively illuminating the eye to indicate a correct or wrong answer. A plurality of cards each have a question relating to a particular curriculum on a first side and a multiple choice group of answers on an opposite side. A slot is formed in the vertical stand portion for conveying information on one of the cards. A plurality of switches are operative to illuminate the different colored electric lamps to indicate when a correct or wrong answer has been given.

9 Claims, 4 Drawing Sheets

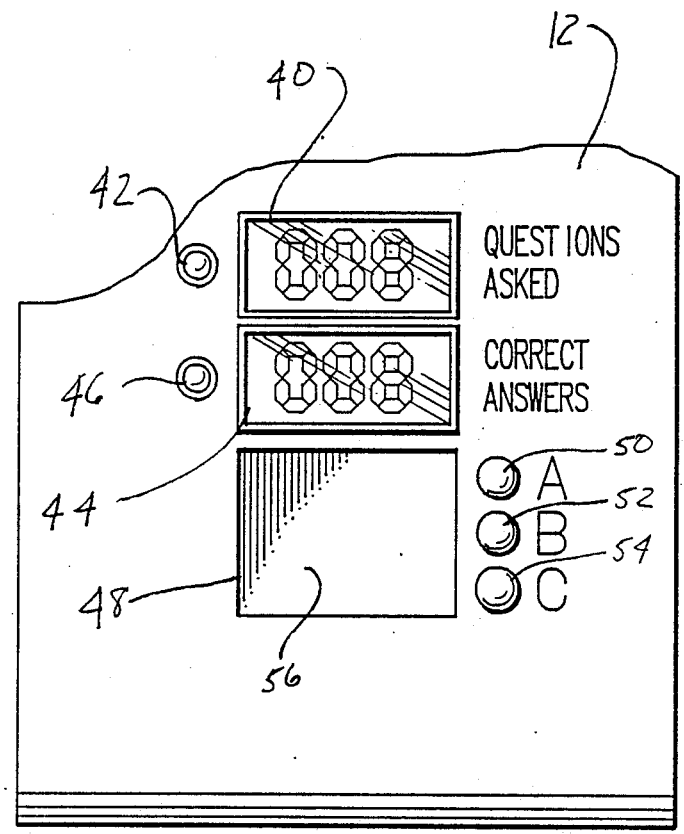
Fig. 5
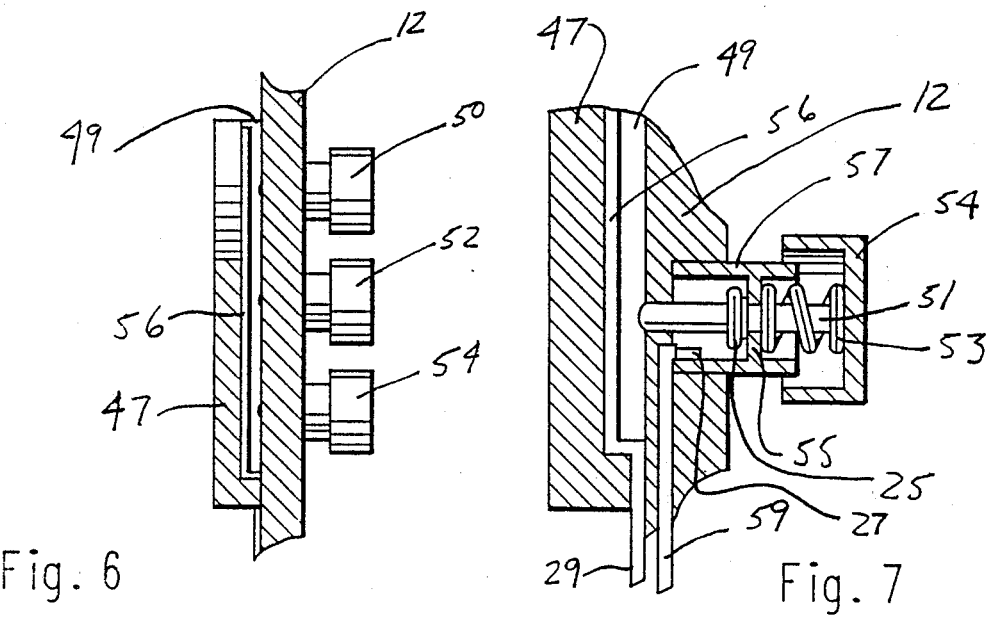
Fig. 6
Fig. 7

EDUCATIONAL DEVICE

BACKGROUND OF THE INVENTION

1. Field of the Invention

The present invention relates to educational devices, and more particularly pertains to an improved educational device for providing an entertaining and stimulating forum for testing an individual's knowledge of a particular subject utilizing a plurality of question and answer cards. Many individuals, and especially younger children have a limited attention span and are frequently distracted by other thoughts in a classroom environment when faced with conventional educational techniques. In order to provide a more stimulating educational environment, the present invention provides a visual blocking stand and a plurality of question and answer cards, in conjunction with a selectively illuminated human eye representation to provide a positive visual reinforcement of a correctly answered question.

2. Description of the Prior Art

Various types of educational devices are known in the prior art. A typical example of such an educational device is to be found in U.S. Pat. No. 4,451,911, which issued to G. Klose et al on May 29, 1984. This patent discloses an electronic toy doll including electronic control circuitry responsive to selection of one of a plurality of switches on the doll housing for providing associated stored vocal messages. U.S. Pat. No. 4,464,124, which issued to H. Romero et al on Aug. 7, 1984, discloses an electrical educational device including a magnetic tape player for reproducing information from adjacent channels on a magnetic tape. In a first portion, a given question and a plurality of possible answers are recorded on both channels and in a second portion, a quoted indication of the correct answer is recorded. U.S. Pat. No. 4,474,557, which issued to M. Clossey on Oct. 2, 1984, discloses an electronic world map game adapted for use as a teaching aid for instructing school pupils in the recognition of land masses of the world map. U.S. Pat. No. 4,505,682, which issued to B. Thompson on Mar. 19, 1985, discloses an electronic learning aid with a match and compare mode of operation. An electronic speech synthesizer is operatively associated with a bar code reader which selects speech words or phrases to be produced by the speech synthesizer. The device is utilized by an operator to select an object of comparison such as a display picture, with a number or other indicia to identify one of a plurality of answer choices. U.S. Pat. No. 4,673,357, which issued to T. Ito on June 16, 1987, discloses a teaching machine which includes a card to pose a question to a user of the machine and to accommodate both a first case wherein a voice signal is audibly reproduced before the user enters his answer to the question into the machine and a second case wherein a voice signal is audibly reproduced after the user enters his answer into the machine.

While the above mentioned devices are directed to educational devices, none of these devices disclose a generally L-shaped visual blocking stand having a vertical portion provided with a representation of a human eye which is selectively illuminatable by two different colored electrical lamps to indicate a correct or a wrong answer. Inasmuch as the art is relatively crowded with respect to these various types of educational devices, it can be appreciated that there is a continuing need for and interest in improvements to such educational devices, and in this respect, the present invention addresses this need and interest.

SUMMARY OF THE INVENTION

In view of the foregoing disadvantages inherent in the known types of educational devices now present in the prior art, the present invention provides an improved educational device. As such, the general purpose of the present invention, which will be described subsequently in greater detail, is to provide a new and improved educational device which has all the advantages of the prior art educational devices and none of the disadvantages.

To attain this, representative embodiments of the concepts of the present invention are illustrated in the drawings and make use of an educational device which includes a generally L-shaped visual blocking stand for obstructing visual contact between a question asking individual and a question answering individual. A representation of a human eye is formed on one side of a vertical portion of the stand and includes two different colored electric lamps connected for selectively illuminating the eye to indicate a correct or wrong answer. A plurality of cards each have a question relating to a particular curriculum on a first side and a multiple choice group of answers on an opposite side. A slot is formed in the vertical stand portion for conveying information on one of the cards. A plurality of switches are operative to illuminate the different colored electric lamps to indicate when a correct or wrong answer has been given.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved educational device which has all the advantages of the prior art educational devices and none of the disadvantages.

It is another object of the present invention to provide a new and improved educational device which may be easily and efficiently manufactured and marketed.

It is a further object of the present invention to provide a new and improved educational device which is of a durable and reliable construction.

An even further object of the present invention is to provide a new and improved educational device which is susceptible of a low cost of manufacture with regard to both materials and labor, and which accordingly is then susceptible of low prices of sale to the consuming public, thereby making such educational devices economically available to the buying public.

Still yet another object of the present invention is to provide a new and improved educational device which provides in the apparatuses and methods of the prior art some of the advantages thereof, while simultaneously overcoming some of the disadvantages normally associated therewith.

Still another object of the present invention is to provide a new and improved educational device for instructing school children in a stimulating educational environment.

Yet another object of the present invention is to provide a new and improved educational device which utilizes a visual blocking stand having a vertical portion provided with a representation of a human eye which is selectively illuminatable by two differently colored electric lamps to indicate correct and wrong answers.

Even still another object of the present invention is to provide a new and improved educational device which includes a visual blocking stand having a vertical portion provided with a selectively illuminatable electric eye representation upon the correct answering of a subject question card.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. cl BRIEF DESCRIPTION OF THE DRAWINGS The invention will be better understood and objects other than those set forth above will become apparent when consideration is given to the following detailed description thereof. Such description makes reference to the annexed drawings wherein:

FIG. 5 is a partial front view illustrating an educational device according to a second embodiment of the present invention.

FIG. 6 is a cross sectional detail view, further illustrating the educational device of FIG. 5.

FIG. 7 is an additional cross sectional detail view, further illustrating the educational device of FIG. 5.

DESCRIPTION OF THE PREFERRED EMBODIMENT

Figure 1:
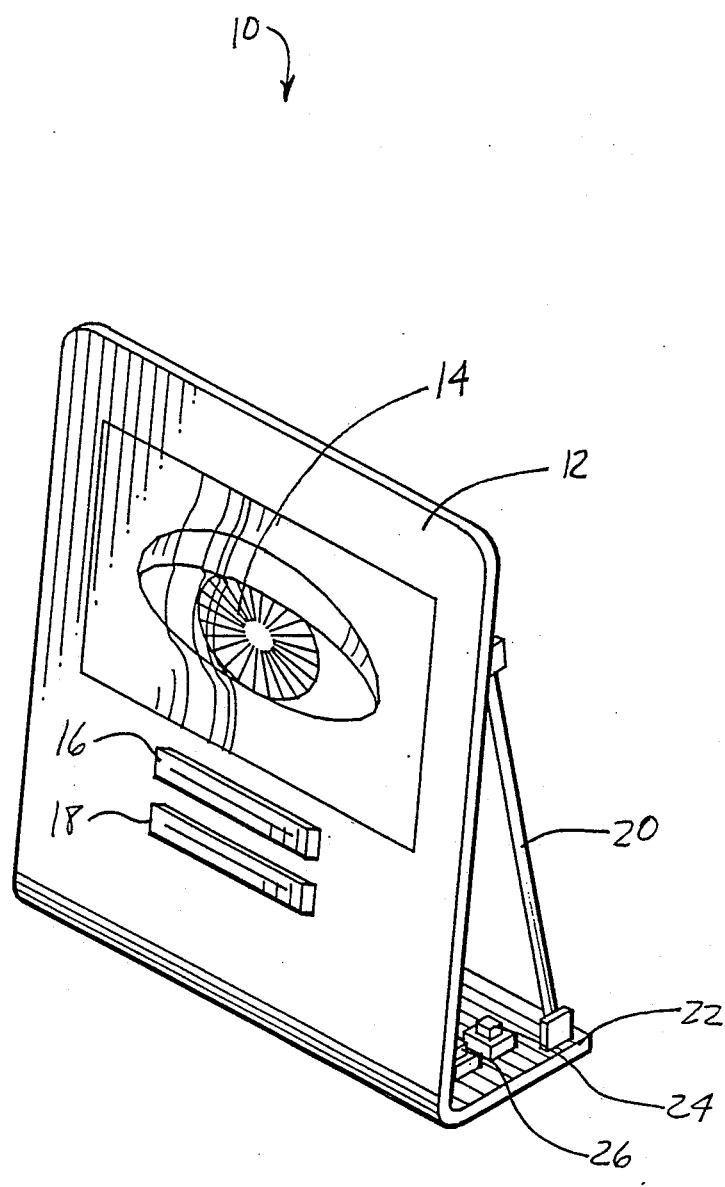
FIG. 1 is a perspective view of the educational device according to the present invention.

With reference now to the drawings, and in particular to FIG. 1 thereof, a new and improved educational device embodying the principles and concepts of the present invention and generally designated by the reference numeral 10 will be described.

More specifically, it will be noted that the first embodiment 10 of the invention includes a generally L-shaped visual blocking stand having a vertical portion 12 and a horizontal portion 22. The blocking stand is preferably formed from a thin molded plastic material and may include a pair of symmetrically disposed aluminum brace rods, one of which is illustrated at 20. A representation of a human eye 14 is formed on one side of the vertical portion 12, and is adapted to face an individual who will be answering questions on a particular subject matter. A pair of slots 16 and 18 are formed through the vertical portion 12 and are disposed in a horizontal orientation and dimensioned to receive question and answer cards in an edgewise fashion. The human eye representation 14 is preferably formed from a tinted translucent material and has an interior portion which houses a pair of different colored electric lamps. The electric lamps are preferably blue and green, although other colors may be utilized. The vertical stand also includes an enclosed battery for illuminating the electric lamps in the eye 14 when a selected switch 24 or 26 is depressed. The switches 24 and 26 are positioned on the upper surface of the horizontal stand portion 22 and are adapted for actuation by an individual who will be asking questions of a student on the opposite side of the vertical portion 12.

Figure 2:
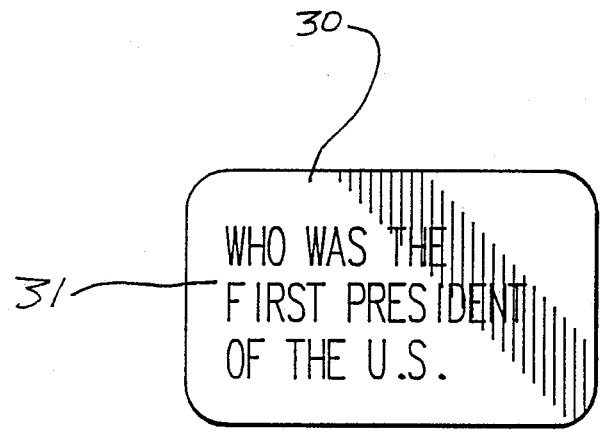
FIG. 2 illustrates a front face of a sample question card.

FIG. 2 illustrates an example question and answer card 30. As shown, a question pertaining to a particular subject is printed on a front face 31 of the card 30.

Figure 3:
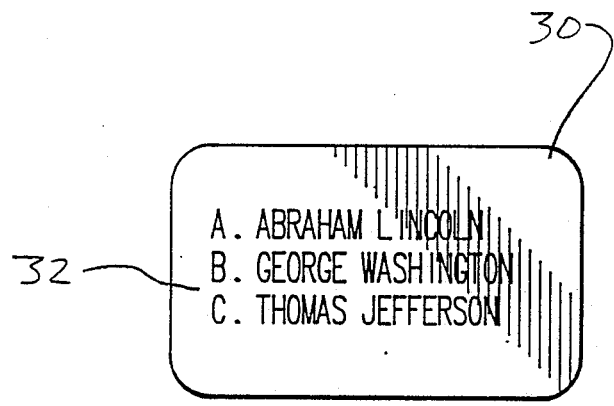
FIG. 3 illustrates the back face of the sample question card of FIG. 2.

As shown in FIG. 3, the card 30 has a multiple choice group of answers 32 printed on the opposite face. It should be noted that the card 30 is intended to be exemplary only, and a large number of question and answer cards may be provided in a variety of different subjects. Additionally, blank cards may be furnished to allow a teacher to formulate applicable questions as required.

Figure 4:
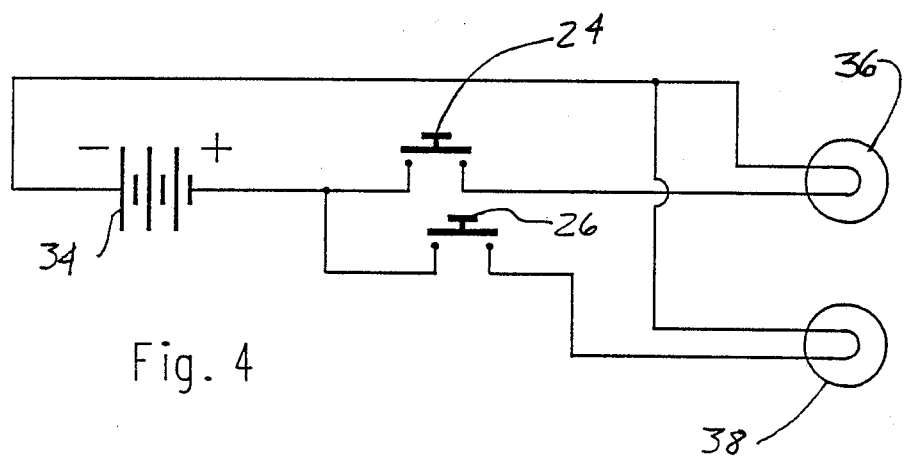
FIG. 4 illustrates the electrical circuit which may be utilized in the educational device according to the first embodiment of the present invention.

FIG. 4 is a schematic diagram which illustrates the electrical components of the present invention. As described previously, a pair of differently colored electric lamps 36 and 38 are situated within the interior portion of the translucent human eye representation 14 (FIG. 1). A battery 34 is connected in parallel with switches 24 and 26, preferably of the push button type. When the push button 24 is depressed, the lamp 36 will be illuminated. Similarly, when the switch 26 is depressed, the lamp 38 will be illuminated. The switches 24 and 26 are intended for use in providing a visual reinforcement and indication of a correct or wrong answer. For example, the lamp 36 may be blue to indicate a wrong answer and the lamp 38 may be green to indicate a correct answer. In use, an individual, which may be a student or teacher, passes a question card 30 (FIG. 2) through the slot 16 shown in FIG. 1. The individual being tested may then record the answer on the back face 32 (FIG. 3) of the card 30 using an erasable marker and passes the card back through the slot 18. Alternatively, the individual may simply call out the answer. The individual or teacher asking the question then checks the answer on an answer key and depresses the appropriate switch 24 or 26 to indicate the result.

FIG. 5 illustrates a modification of the invention in which a pair of digital counters 40 and 44 are utilized to keep record of the number of questions asked and the number of questions answered correctly. The digital counters 40 and 44 are provided on the front portion of the vertical leg 12 of the stand shown in FIG. 1. The counters include respective reset buttons 42 and 46. An open window slot 48 is dimensioned to display a question and answer set of a single card. Three push button type switches 50, 52 and 54 are disposed in a vertical array and are each associated with a letter A, B or C as shown.

As illustrated in FIG. 6, a backing wall 47 of the window slot 48 (FIG. 5) is provided with a metallic contact plate 56. A vertical slot 49 is dimensioned to allow insertion of a question and answer card.

As shown in FIG. 7, each of the push button switches for example 54, include a stem 51 mounted for axial reciprocal movement. A coil spring 53 surrounds the stem 51 and is captured between the inner surface of the push button 54 and a flange 55 formed within a cylindrical mounting well 57. A radial flange 25 on the metallic stem 51 serves as an electrical contact adapted for abutment with the fixed electrical contact 27, connected to the electrical lead 59. The metallic backing plate 56 is connected to an electrical lead 29. When the push button switch 54 is fully depressed, the contact 25 abuts the contact 27 and the end of the metal stem 51 abuts the contact plate 56, forming a complete circuit.

Figures 8, 9:
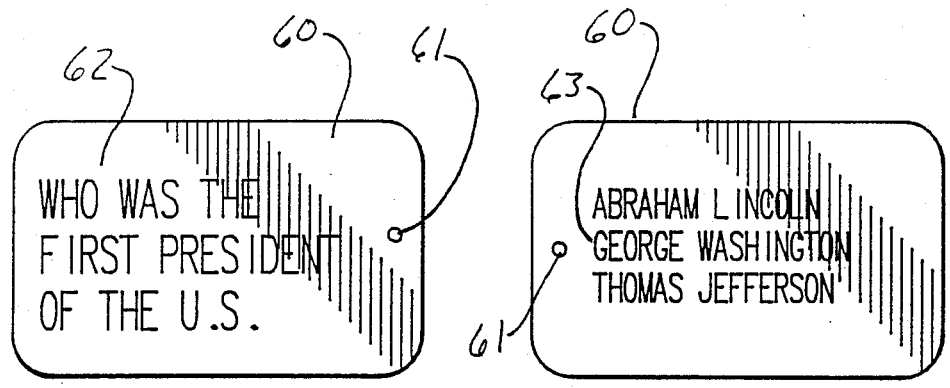
FIG. 8 illustrates the front face of a second form of sample question card.
FIG. 9 illustrates the back face of the sample question card on FIG. 8.

FIG. 8 illustrates a second form of question card 60 which has a circular aperture 61 formed adjacent one end edge portion. The aperture 61 is dimensioned for passage of the stem 51 (FIG. 7). A front face 62 of the card 60 is printed with a suitable question.

As shown in FIG. 9, the back face 63 of the card 60 is printed with a multiple choice answer array.

In use, the card 60 is initially inserted through the slot 49 (FIG. 6) for display of the question 62 through the window 48 (FIG. 5). After the student has had an opportunity to read the question, the card 60 is then inverted and replaced in the slot 49 to display the answers on the back face 63. If the student depresses the correct answer button 52, the stem 51 associated with the push button switch 52 (FIG. 7), will pass through the aperture 61 and may contact with the backing plate 56, forming a complete circuit. If the student answers incorrectly by depressing button 50 or 54, the question card 60, which is formed from on an insulated material, will prevent completion of the circuit.

Figure 10:
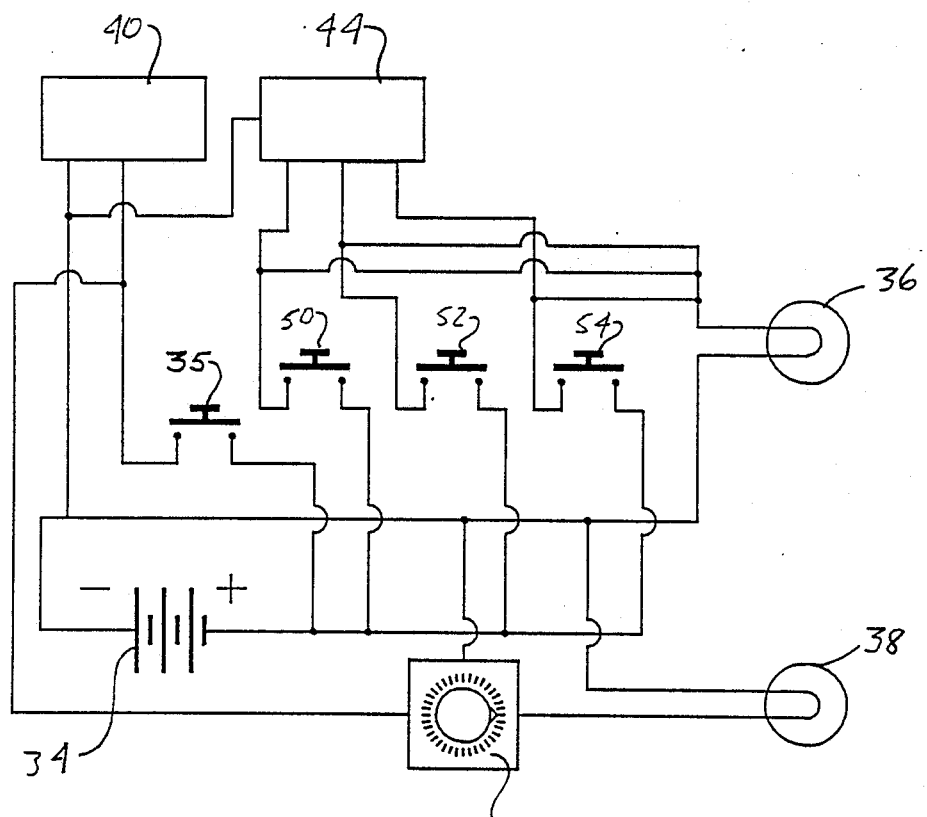
FIG. 10 illustrates a schematic diagram of the educational device according to a second embodiment of the present invention.

FIG. 10 illustrates an example schematic circuit embodying the concepts of the second embodiment of the present invention. The circuit includes a "question posed" switch 35 which connects the battery 34 to increment the "questions asked" counter 40 and simultaneously initializes a timer 37. The timer 37 preferably is of a user adjustable type to provide a predetermined time interval upon initialization by depressing the switch 35. The timer 37 is operative to illuminate the electric lamp 38, preferably colored blue to indicate a wrong answer. The switch 35 may be depressed by the teacher, after inverting the question card to display the answers through the window 48 illustrated in FIG. 5. The student then depresses one of the push buttons 50, 52 or 54 in an attempt to answer the question correctly. If the student succeeds in correctly answering the question, the green lamp 36 is then illuminated to indicate a correct answer. Simultaneously, the correct answer counter 44 is incremented. As described previously, the electric lamps 36 and 38 are preferably located in a hollow interior portion of the human eye representation 14 (FIG. 1).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An educational device, comprising:
    a visual blocking stand having a vertical portion for obstructing visual contact between two individuals;
    a plurality of cards, each having a question relating to a particular curriculum on a first side and a multiple choice group of answers on an opposite side;
    at least one slot formed in said vertical portion of said stand for conveying information on one of said cards;
    a representation of a human eye on one side of said vertical portion of said stand;
    two different colored electrical light sources disposed for illuminating said eye;
    a power source for supplying electrical current to said light sources; and
    switch means on said stand for selectively illuminating said light sources to indicate a correct or wrong answer.

2. The educational device of claim 1, wherein said blocking stand has a generally L-shaped configuration with a horizontal portion extending from a side of said vertical portion opposite said eye, said switch means on an upper surface of said horizontal portion.

3. The educational device of claim 1, further comprising scoring means for keeping track of the number of questions asked and correctly answered.

4. The educational device of claim 3, wherein said scoring means comprises electronic digital counters.

5. The educational device of claim 4, further comprising a plurality of switches, each associated with one of said multiple choice answers, and means for incrementing a correct answer total and simultaneously illuminating one of said light sources when a switch associated with a corrected answer is activated.

6. The educational device of claim 1, wherein said slot comprises a horizontal slot dimensioned for passage of one of said cards.

7. The educational device of claim 1, wherein said slot is a vertical slot associated with a display window dimensioned for display of one side of one of said cards.

8. The educational device of claim 7, further comprising a metallic contact backing plate associated with said window;
an aperture formed through each of said cards in alignment with a correct answer; and
a plurality of switches, each including a reciprocal stem dimensioned for insertion through said card apertures, upon depressing a switch in alignment with a correct answer.

9. The educational device of claim 8, further comprising a question posed switch operative to increment a question asked total on one of said digital counters;
a timer connected to be initialized by said question posed switch; and
one of said light sources energized upon expiration of a predetermined time interval after initialization of said timer to indicate a wrong answer.

* * * * *